(12) United States Patent
Tiwari

(10) Patent No.: US 9,043,757 B2
(45) Date of Patent: May 26, 2015

(54) IDENTIFYING DIFFERENCES BETWEEN SOURCE CODES OF DIFFERENT VERSIONS OF A SOFTWARE WHEN EACH SOURCE CODE IS ORGANIZED USING INCORPORATED FILES

(71) Applicant: Oracle International Corporation, Redwood Shores, CA (US)

(72) Inventor: Praneet Tiwari, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 167 days.

(21) Appl. No.: 13/712,974

(22) Filed: Dec. 13, 2012

(65) Prior Publication Data

US 2014/0173559 A1 Jun. 19, 2014

(51) Int. Cl.
*G06F 9/44* (2006.01)

(52) U.S. Cl.
CPC ... *G06F 8/71* (2013.01); *G06F 8/31* (2013.01)

(58) Field of Classification Search
None
See application file for complete search history.

(56) References Cited

U.S. PATENT DOCUMENTS

| | | | | |
|---|---|---|---|---|
| 4,464,650 A | * | 8/1984 | Eastman et al. | 341/51 |
| 4,667,290 A | * | 5/1987 | Goss et al. | 717/147 |
| 5,276,880 A | * | 1/1994 | Platoff et al. | 717/143 |
| 5,313,387 A | * | 5/1994 | McKeeman et al. | 700/90 |
| 5,325,531 A | * | 6/1994 | McKeeman et al. | 717/145 |
| 5,355,493 A | * | 10/1994 | Silberbauer et al. | 717/136 |
| 5,386,570 A | * | 1/1995 | Lindhorst | 717/146 |
| 5,408,603 A | * | 4/1995 | Van de Lavoir et al. | 715/763 |
| 5,574,898 A | | 11/1996 | Leblang et al. | |
| 5,974,254 A | * | 10/1999 | Hsu | 717/122 |
| 5,978,580 A | * | 11/1999 | Wang et al. | 717/100 |
| 6,061,513 A | * | 5/2000 | Scandura | 717/142 |
| 6,519,767 B1 | * | 2/2003 | Carter et al. | 717/122 |
| 6,614,789 B1 | * | 9/2003 | Yazdani et al. | 370/392 |
| 6,823,356 B1 | * | 11/2004 | Novaes et al. | 709/201 |
| 6,859,455 B1 | * | 2/2005 | Yazdani et al. | 370/392 |
| 7,503,038 B2 | * | 3/2009 | Pandit et al. | 717/141 |
| 7,571,427 B2 | * | 8/2009 | Wang et al. | 717/122 |
| 7,624,385 B2 | * | 11/2009 | Waddington et al. | 717/143 |
| 7,653,619 B1 | * | 1/2010 | Depelteau et al. | 707/706 |
| 7,707,562 B1 | * | 4/2010 | Kaltenbach | 717/136 |
| 7,747,599 B1 | * | 6/2010 | Depelteau et al. | 707/706 |

(Continued)

OTHER PUBLICATIONS

Conradi, Westfechtel, "Verion Models for Software Configuration Management", 1998 ACM; [retrieved on Feb. 1, 2015]; Retrieved from Internet <URL: http://dl.acm.org/ft_gateway.cfm?id=280280& ftid=41336>; pp. 232-282.*

(Continued)

*Primary Examiner* — Xi D Chen
(74) *Attorney, Agent, or Firm* — Narendra Reddy Thappeta

(57) ABSTRACT

An aspect of the present invention identifies differences between source codes (e.g. of different versions of a software), when each source code is organized using incorporated files. In one embodiment, in response to receiving identifiers of a first and second source codes (each source code being organized as a corresponding set of code files), listings of the instructions in the first and second source codes are constructed. Each listing is constructed, for example, by replacing each incorporate statement in the source code with instructions stored in a corresponding one of code files. The differences between the first and second source codes are then found by comparing the constructed listings of instructions.

16 Claims, 10 Drawing Sheets

(56) References Cited

U.S. PATENT DOCUMENTS

| | | | |
|---|---|---|---|
| 7,805,427 B1* | 9/2010 | Depelteau | 707/706 |
| 8,161,466 B2* | 4/2012 | Jeong | 717/140 |
| 8,291,398 B2* | 10/2012 | Kawahito et al. | 717/141 |
| 8,533,668 B2* | 9/2013 | De Oliveira Costa | 717/122 |
| 8,775,974 B2* | 7/2014 | Cowan et al. | 717/122 |
| 8,806,456 B2* | 8/2014 | Gazzillo et al. | 717/142 |
| 2003/0028864 A1* | 2/2003 | Bowen | 717/141 |
| 2003/0033594 A1* | 2/2003 | Bowen | 717/141 |
| 2003/0046671 A1* | 3/2003 | Bowen | 717/141 |
| 2004/0210885 A1 | 10/2004 | Wang et al. | |
| 2007/0011654 A1* | 1/2007 | Opperman | 717/122 |
| 2007/0226710 A1 | 9/2007 | Sharma et al. | |
| 2008/0301668 A1 | 12/2008 | Zachmann | |
| 2009/0100410 A1 | 4/2009 | Pouliot | |
| 2013/0326204 A1* | 12/2013 | Grimm et al. | 712/234 |

OTHER PUBLICATIONS

Mehra, et al., "(A Generic approach to Supporting Diagram Differencing and Merging for Collaborative Design"; 2005 ACM; [retrieved on Feb. 1, 2015]; Retrieved from Internet <URL: http://dl.acm.org/ft_gateway.cfm?id=1101940&ftid=338183>; pp. 204-213.*

Vidacs, et al., "Columbus Schema for C/C++ Preprocessing", 2004 IEEE; [retrieved on Feb. 1, 2015]; Retrieved from Internet <URL: http://ieeexplore.ieee.org/stamp/stamp.jsp?tp=&arnumber=1281408>; pp. 232-282.*

Gondow, et al., "TBCppA: a Tracer Approach for Automatic Accurate Analysis of C Preprocessor's Behaviors"; 2008, IEEE; [retrieved on Feb. 1, 2015]; Retrieved from Internet <URL: http://ieeexplore.ieee.org/stamp/stamp.jsp?tp=&arnumber=4637537>; pp. 35-44.*

Configuration Management Tools for Version Control in Windows and Linux, http://developeriq.in/articles/2008/sep/16/configuration-management-tools-version-control-win, Downloaded circa May 25, 2012, pp. 1-8.

Great Features in Netbeans IDE 6.1, http://zachelko-programming.blogspot.in/2008/06/10-great-features-in-netbeans-ide-61.html, Downloaded circa May 25, 2012, pp. 1-5.

Google Web Toolkit, http://code.google.com/p/google-web-toolkit/wiki/GwtJavaApiCompatibilityChecker, Downloaded circa May 25, 2012, pp. 1-3.

Hoan Anh Nguyen, Tung Thanh Nguyen, Hung Viet Nguyen, and Tien N. Nguyen, iDiff: Interaction-based Program Differencing Tool,In ASE 201, pp. 572-575, IEEE, 2011, Lawrence, KS, USA.

Taweesup Apiwattanapong, Alessandro Orso, Mary Jean Harrold, A Differencing Algorithm for Object-Oriented Programs, ASE '04 Proceedings of the 19th IEEE international conference on Automated software engineering, date Sep. 20-25, 2004, pp. 2-13, IEEE Computer Society Washington, DC, USA.

* cited by examiner

FIG. 3

```
                                                        320
#ifndef _B_H
define _B_H  1 int lock_destroy (lock * __lock);
lock *lock_open (const char * __name,
                               int __oflag , ... );
#endif
```

```
                                                        330
#ifndef _C_H
#define _C_H  1
typedef union {
    int __size [_SIZEOF_LOCK];
    int __align;
} lock;

int lock_init (lock * __lock, int __pshared);
#endif
```

```
                                                        350
include <a.h> int main () {
    // do nothing
}
```

```
                                                        310
#ifndef _A_H
define _A_H  1 if __WORDSIZE = 64
    #define _SIZEOF_LOCK   32
    #include <c.h>
#else
    #define _SIZEOF_LOCK   16
    #include <d.h>
#endif
#ifndef EOF
    #define EOF (-1)
endif include <b.h>
typedef _G_va_list va_list;
int remove (const char * __filename);
char *tmpnam_r (char * __s);
#endif
```

```
                                                        340
#ifndef _D_H
#define _D_H  1
typedef struct {
    char __size [_SIZEOF_LOCK];
    long int __align;
} lock;

int lock_init (lock * __lock, int __pshared,
                              unsigned int __value);
#endif
```

```
         300
+ os1.0
    ├ a.h ← 310
    ├ b.h ← 320
    ├ c.h ← 330
    ├ d.h ← 340
    └ main.c ← 350
```

FIG. 4

```
410
#ifndef __A_H__
define __A_H__ 1 if __WORDSIZE == 64
    #define __SIZEOF_LOCK 32
    #include <c.h>
#else
    #define __SIZEOF_LOCK 16
    #include <d.h>
#endif
#ifndef EOF
    #define EOF (-1)
endif include <b.h> int remove (const char * __filename);
char *tmpnam_r (char * __s);
#endif
```

```
420
#ifndef __B_H__
define __B_H__ 1 int lock_destroy (lock * __lock);
lock *lock_open (const char * __name,
                 int __oflag , ... );

#endif
```

```
430
#ifndef __C_H__
#define __C_H__ 1
typedef union {
    int __size [__SIZEOF_LOCK];
    int __align;
} lock;

int lock_init (lock * __lock, int __pshared);
#endif
```

```
440
#ifndef __D_H__
#define __D_H__ 1
typedef struct {
    char __size [__SIZEOF_LOCK];
    unsigned long long __align;
} lock;

int lock_init (lock * __lock);
#endif
```

```
450
include <a.h> int main () {
    // do nothing
}
```

```
400
+ os2.0
  ├── a.h ◄── 410
  ├── b.h ◄── 420
  ├── c.h ◄── 430
  ├── d.h ◄── 440
  └── main.c ◄── 450
```

```
#ifndef _A_H
    #define _A_H    1
    /** Root node ends here */
    #if __WORDSIZE = 64
        /** Beginning of a conditional node */
        #define __SIZEOF_LOCK       32
        /** from c. h in lieu of #include <c.h>   */
        #ifndef _C_H                                                    330
            #define _C_H   1
            typedef union {
                int __size [__SIZEOF_LOCK];
                int __align;
            } lock;
            int lock init (lock *__lock, int __pshared);
        #endif
        /** end c.h */
        /** End of a conditional node */
    #else
        /** Beginning of a conditional node */
        #define __SIZEOF_LOCK       16
        /** from d. h in lieu of #include <d.h>   */
        #ifndef _D_H                                                    340
            #define _D_H   1
            typedef struct {
                char __size [__SIZEOF_LOCK];
                long int __align;
            } lock;
            int lock init (lock * __lock, int __pshared, unsigned int __value);
        #endif
        /** end d.h */
        /** End of a conditional node */
    #endif
    #ifndef EOF
        #define EOF     (-1)
    #endif
    /** Beginning of a node */
    /** from b. h in lieu of #include <b.h>   */
    #ifndef _B_H                                                        320
        #define _B_H       1
        int lock_destroy (lock * __ lock);
        lock *lock_open (const char * __name, int __oflag , ... );
    #endif
    /** end b.h */
    /** End of a node */
    /** an unconditional typedef */
    typedef _G_va_list va_list;
    /** unconditional declarations */
    int remove (const char * __ filename);
    char *tmpnam_r (char * __ s);
#endif /* for the entire file */
```

```
#ifndef _A_H
    #define _A_H    1
    /** Root node ends here */
    #if __WORDSIZE = 64
        /** Beginning of a conditional node */
        #define __SIZEOF_LOCK    32
        /** from c. h in lieu of #include <c.h>   */
        #ifndef _C_H                                                    430
            #define _C_H    1
            typedef union {
                int __size [ __SIZEOF_LOCK];
                int __ align;
            } lock;
            int lock init (lock *__lock, int __pshared);
        #endif
        /** end c.h */
        /** End of a conditional node */
    #else
        /** Beginning of a conditional node */
        #define __SIZEOF_LOCK    16
        /** from d. h in lieu of #include <d.h>   */
        #ifndef _D_H                                                    440
            #define _D_H   1
            typedef struct {
                char __size [__SIZEOF_LOCK];
                unsigned long long __align;
            } lock;
            int lock init (lock * __lock);
        #endif
        /** end d.h */
        /** End of a conditional node */
    #endif
    #ifndef EOF
        #define EOF    (-1)
    #endif
    /** Beginning of a node */
    /** from b. h in lieu of #include <b.h>   */
    #ifndef _B_H                                                        420
        #define _B_H    1
        int lock_destroy (lock * __ lock);
        lock *lock_open (const char * __name, int __oflag , ... );
    #endif
    /** end b.h */
    /** End of a node */
    /** unconditional declarations */
    int remove (const char * __ filename);
    char *tmpnam_r (char * __ s);
#endif /* for the entire file */
```

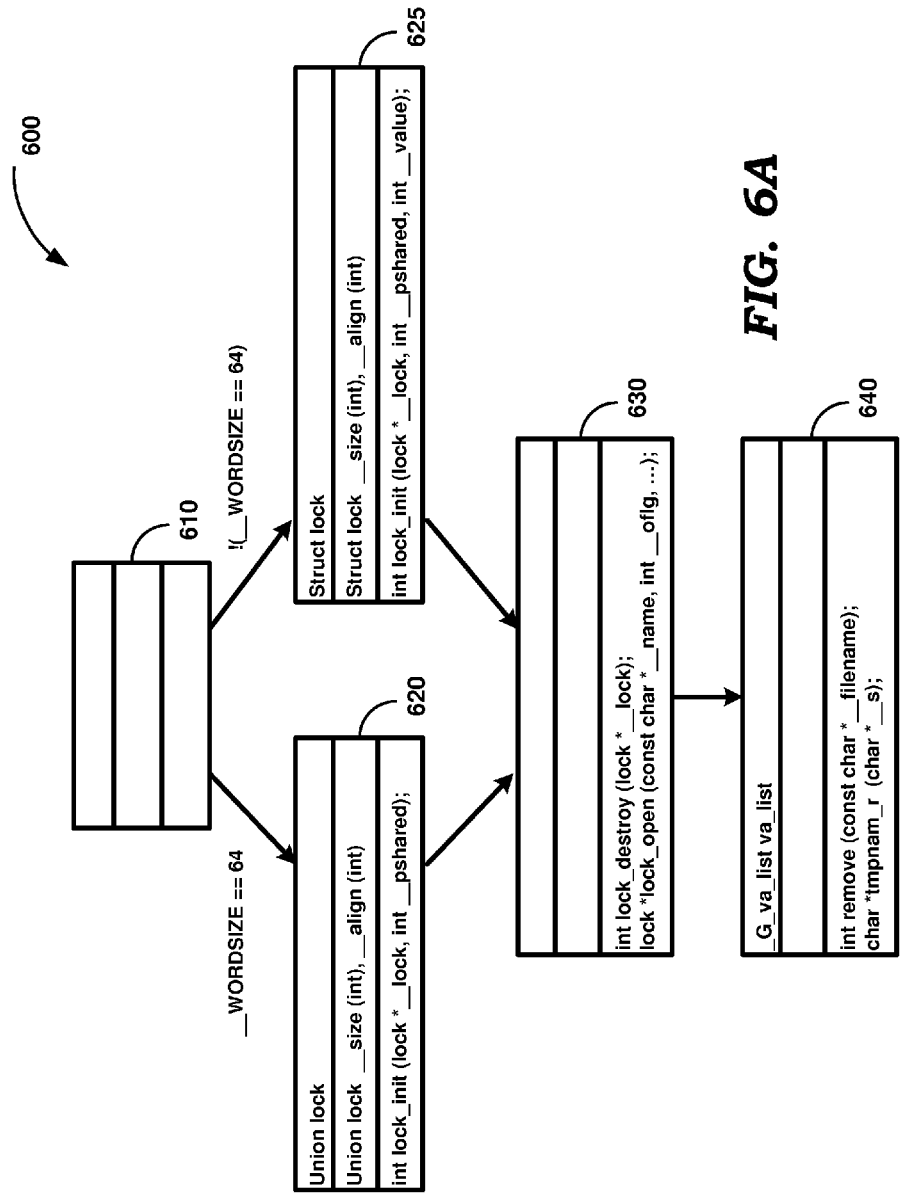

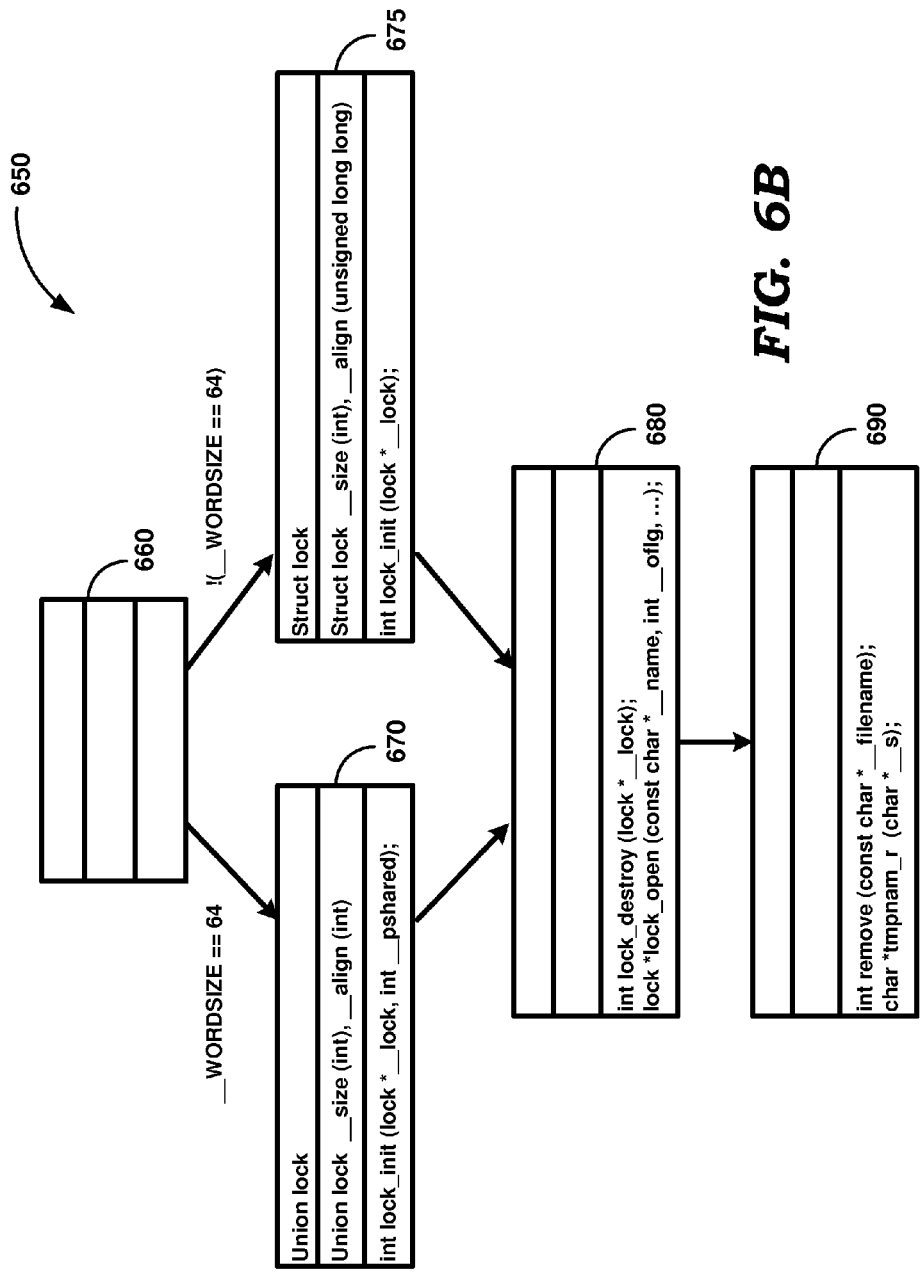

IDENTIFYING DIFFERENCES BETWEEN SOURCE CODES OF DIFFERENT VERSIONS OF A SOFTWARE WHEN EACH SOURCE CODE IS ORGANIZED USING INCORPORATED FILES

BACKGROUND OF THE INVENTION

1. Technical Field

The present disclosure relates to checking of software, and more specifically to identifying differences between source codes of different versions of a software when each source code is organized using incorporated files.

2. Related Art

Software generally refers to instructions, which when executed provides a corresponding function for which the software is designed. As is well known, developers often provide later versions of a software, for example, to provide enhanced functionality, fix known problems, etc.

Source code generally contains human-understandable instructions written in higher level programming languages such as C, C++, C#, Java, Python, etc. Typically such source code is converted into lower level language code (e.g., assembly, IL) that can be executed to provide the corresponding function. Software is generally developed at such higher levels for the convenience of developers. Therefore, each version of a software is represented by a corresponding source code.

Source code is typically organized as instructions contained in several files, with some files having incorporate statements ('#include' in C programming language, 'import' in Java programming language) which operate to include the instructions in the corresponding specified files. Incorporation implies that the higher level language instructions contained in the specified files are included as part of the file (containing the incorporate statements), before conversion into lower level languages.

There is often a need to identify differences between source codes of different versions of a software. For example, a developer migrating a software application to operate with a newer version of an operating system, may wish to identify the material differences in source codes between the older and newer versions of the operating system to determine any changes required to be made to software applications that execute based on the operating system.

BRIEF DESCRIPTION OF THE DRAWINGS

Example embodiments of the present invention will be described with reference to the accompanying drawings briefly described below.

FIGS. 3 and 4 depict the content of some of the code files respectively in a first/older version and a second/newer version of a software in one embodiment.

FIGS. 5A and 5B depict the respective listing of instructions constructed for a first/older version and a second/newer version of a software in one embodiment.

FIGS. 6A and 6B depict the respective hierarchy of nodes/functional constructs determined for the listing of instructions for a first/older version and a second/newer version of a software in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention identifies differences between source codes (e.g. of different versions of a software), when each source code is organized using incorporated files. In one embodiment, in response to receiving identifiers of a first and second source codes (each source code being organized as a corresponding set of code files), listings of the instructions in the first and second source codes are constructed. Each listing is constructed by including, for each incorporate statement in the source code, the instructions stored in a corresponding one of code files (specified by the incorporate statement). The differences between the first and second source codes are then found by comparing the constructed listings of instructions.

Another aspect of the present invention facilitates the finding of the differences between the listings (and thereby the source codes) by first determining the functional constructs in the first and second listing (for the first and second source code respectively). A first and second hierarchy of nodes are then built, each node in the first/second hierarchy indicating the respective functional constructs determined in a corresponding code portions of the first/second listings. The functional constructs in each node of the first hierarchy is then compared with the constructs in a corresponding node of the second hierarchy to determine the differences.

One more aspect of the present invention facilitates processing of a conditional incorporate statement (having a condition) which indicates that a first code file is to be incorporated when the condition is true and a second code file is to be incorporated when the condition is false. In one embodiment, the instructions stored in both the first and second files are included as respective code portions in the listing of instructions. The functional constructs determined in the respective code portions are then stored (and later compared) as corresponding nodes (identified by the condition) in the hierarchy. Accordingly, the conditional incorporate statement is processed without requiring the evaluation of the condition.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
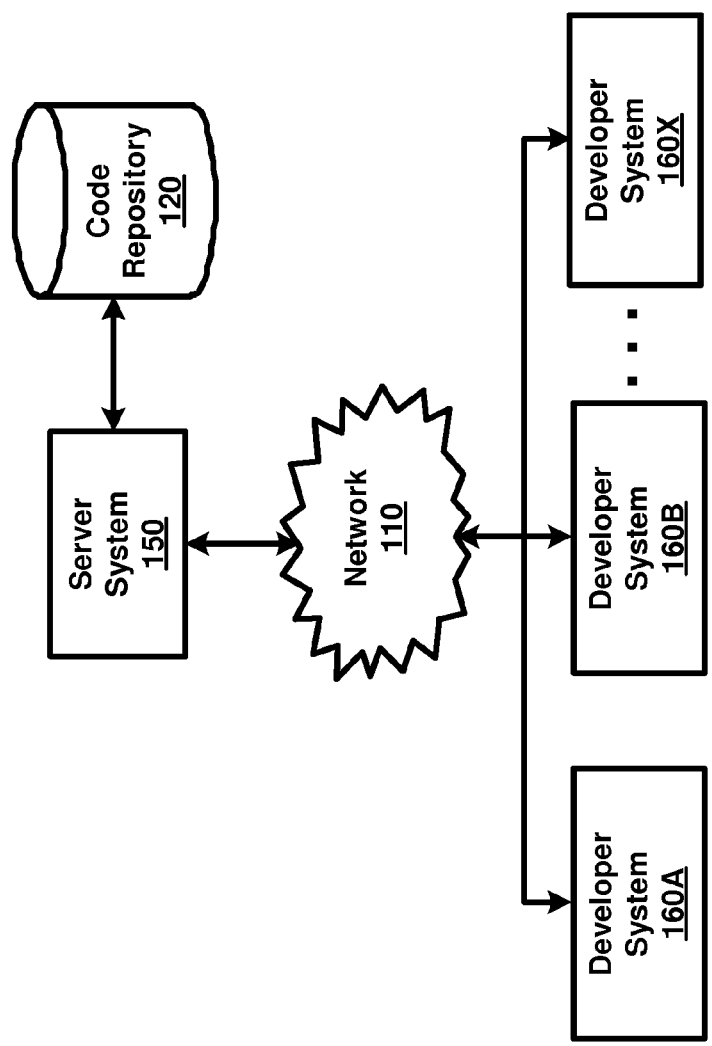
FIG. 1 is a block diagram illustrating an example environment in which several features of the present invention are implemented.

FIG. 1 is a block diagram illustrating an example environment in which several aspects of the present invention can be implemented. The diagram is shown containing network 110, code repository 120, server system 150 and developer systems 160A-160X. Merely for illustration, only representative number/type of devices and systems are shown in FIG. 1. Many environments often contain many more systems, both in number and type, depending on the purpose for which the environment is designed. Each block of FIG. 1 is described below in further detail.

Network 110 provides connectivity between server system 150 and developer systems 160A-160X, and may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the target system to which the packet is to be eventually delivered.

A (IP) packet is said to be directed to a target system when the destination IP address of the packet is set to the (IP) address of the target system, such that the packet is eventually delivered to the target system by network 110. When the packet contains content such as port numbers, which specifies the target application, the packet may be said to be directed to such application as well. Network 110 may be implemented using any combination of wire-based or wireless mediums.

Code repository 120 represents a non-volatile storage facilitating storage and retrieval of data by applications executing in server system 150. In particular, code repository 120 is used to maintain source code (forming a software) in a format that can be readily edited by developers (for example, as instructions according to a higher level programming language). Code repository 120 may also maintain multiple source codes corresponding to different versions of the same software.

In one embodiment described below, code repository 120 is implemented as a file store providing storage and retrieval of source code in the form of one or more code files organized as one or more directories, as is well known in the relevant arts. Each code file is uniquely identified by a combination of the name of the file and a path indicating the directory in which the file is located. However, in alternative embodiments, code repository 120 may be implemented as a database server using relational database technologies (where data is organized as tables and rows) and therefore provide storage and retrieval of data using structured queries such as SQL (Structured Query Language). The content of the code files may be stored in one or more rows of multiple tables in such a database server.

Irrespective of such underlying details, in the following description, the term "code file" is used to refer to any portion of software code that is associated with a unique identifier (for example, a name and path combination, a row identifier) and as such can be incorporated in other "code files" by using the unique identifier. In the following description, code files containing incorporate statements (specifying identifiers of corresponding code files) are referred to as "incorporating" files, while the specified code files whose instructions are to be included in the incorporating file are referred to as "incorporated" files.

Each of developer systems 160A-160X represents a system such as a personal computer, workstation, mobile station, etc., that facilitates users/developers to create/modify the source code of a software, for example, to add/modify a functionality of the software, fix errors/bugs uncovered in the software, etc. In particular, developer system facilitates the developer to add/modify one or more code files (containing the source code) maintained in code repository 120. The developer may retrieve/store the desired code files from/to code repository 120 by sending appropriate requests (and receiving corresponding responses) to server system 150. The requests may be generated using appropriate user interfaces.

Server system 150 represents a system such as a web/application server executing applications capable of performing tasks requested by users such as storing/retrieving code files from code repository 120, and managing different versions of a software, etc. In response to receiving requests from developer system 160A-160X, the server system performs the tasks specified in the requests and sends the result of performance of the tasks to the requesting developer system. The server system may use data stored internally (for example, in a non-volatile storage/hard disk within the server), external data (for example, code repository 120) and/or data received from external sources (e.g., from the user) in performing such tasks.

Thus, developers using developer systems 160A-160X may collaboratively (using applications executing in server system 150) develop the source code of a software and maintain the developed source code in code repository 120. The developers may develop and maintain one or more source codes corresponding to different versions of the same software. Each version of source code may be organized in the form of a corresponding set of code files and directories, with the code files containing both incorporating and incorporated files.

As noted in the Background section, there are several situations where it may be desirable or necessary to identify the differences between the source codes of different versions of a software. Server system 150, extended/provided according to several aspects of the present invention identifies differences between source codes of different versions of software while overcoming at least some of the drawbacks noted above. The manner in which server system 150 identified differences between source codes organized as incorporated files is described below with examples.

3. Identifying Differences Between Source Codes

Figure 2:
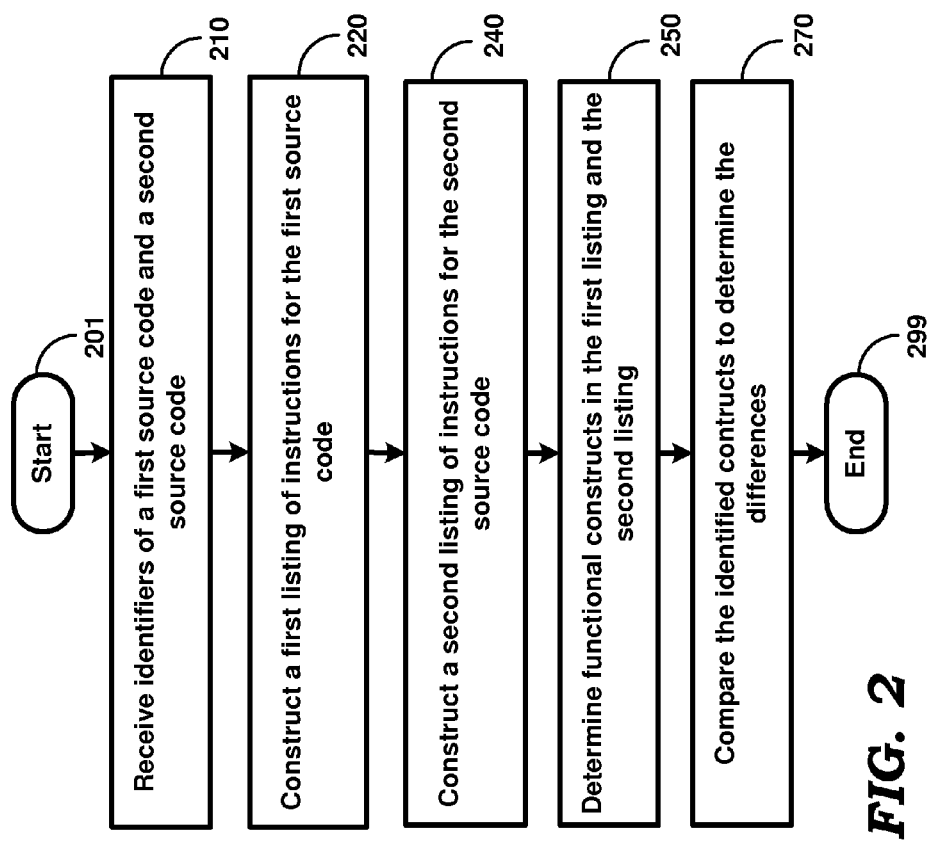
FIG. 2 is a flowchart illustrating the manner in which differences between source codes of different versions of a software when each source code is organized using incorporated files are identified, in an embodiment of the present invention.

FIG. 2 is a flowchart illustrating the manner in which differences between source codes of different versions of a software when each source code is organized using incorporated files are identified, in an embodiment of the present invention. The flowchart is described with respect to FIG. 1 merely for illustration. However, many of the features can be implemented in other environments also without departing from the scope and spirit of several aspects of the present invention, as will be apparent to one skilled in the relevant arts by reading the disclosure provided herein. The flow chart begins in step 201, in which control immediately passes to step 210.

In step 210, server system 150 receives identifiers of a first source code and a second source code of a software (sought to be compared). The identifiers may be received from a developer of the source codes. In one embodiment, the developer using one of developer systems 160A-160X, sends a request containing the identifiers for identifying the differences between the first and second source codes.

In general, the identifiers enable server system 150 to identify and retrieve the code files corresponding to the first and second source codes from code repository 120. For example, the identifiers may correspond to the different version numbers such as 1.0 and 2.0 of the software and/or the names (and paths) of the corresponding directories where the code files for the first and second source codes are located.

In step 220, server system 150 constructs a first listing of instructions for the first source code by including (in the first listing), for each incorporate statement (in an incorporating file), the instructions stored in a corresponding incorporated file (specified by the incorporate statement). The incorporate statement can be replaced by the included instructions. Server system 150 may first retrieve from code repository 120, all the code files corresponding to the first source code (using the identifier received in step 210) and then determine the occurrences of incorporate statement in the retrieved code files. Server system 150 may then replace each determined occurrence with the set of instructions in the corresponding incorporated file, with multiple occurrences of the same incorporate statement being replaced with the multiple instances of the same set of instructions.

In step 240, server system 150 constructs a second listing of instructions for the second source code, for example, similar to constructing of the first listing described above with respect to step 220.

In step 250, server system 150 determines the functional constructs in the first listing and the second listing. Each functional construct represents a specific syntax in a programming language (in which the source codes are written) used to specify significant aspects (such as defining data structures, specifying function declarations, etc.) in the programming logic of the software. Thus, server system 150 does not identify non-significant aspects such as comments and white space in the listings (as not being part of functional constructs).

In step 270, server system 150 compares the determined constructs to identify the differences between the listings and thereby the differences between the sources codes (of different versions of a software). The comparison and determination of the differences in a construct may be performed as per the syntax (and semantics) of the programming language. The determined differences may then be presented (e.g., displayed on a display unit) to the developer, from whom the identifiers were received in step 210. The flow chart ends in step 299.

Thus, server system 150 identifies differences between source codes of different versions of a software, in particular, when each source code is organized using (incorporating and) incorporated files. The approaches thus described can be used in conjunction with software applications written in various programming languages (e.g., C/C++, Java type programming languages, Python, etc.) by understanding the syntax and semantics of the corresponding language, as will be apparent to a skilled practitioner by reading the disclosure herein. The description is continued with respect to an example software written in C programming language.

4. Source Code in C Programming Language

Broadly, source code developed using the C programming language is organized as one or more header files (having the file extension ".h") and source files (having the file extension ".c"). The header files containing data definitions (such as for data types, structures, unions, etc.) and function declarations (that specify the name of the function, the names and types of the parameters, and the return type of the function). The source files contain the implementations of the functions declarations in the header files. The source files are typically shipped as object files containing the instructions in assembly language, in contrast to header files that are shipped as containing C instructions.

Each header file also includes directives (statements starting with the "#" character) that are processed by a pre-processor prior to converting to lower level instructions. Examples of directives are shown in the below table:

| Directive | Purpose |
|---|---|
| #include <filename> | For incorporating the content of "filename" as part of the header file |
| #if condition<br>    Statements1<br>#else<br>    Statements2<br>#endif | For conditionally incorporating "Statements 1" if the condition is evaluated to be true and incorporating "Statements2" if the condition is evaluated to be false. By having #include directive in "Statements1" and/or "Statements2", conditional incorporation of files can be performed. |
| #define symbol | For defining the "symbol" |
| #ifndef symbol<br>    Statements<br>#endif | For conditionally incorporating "Statements" in the header file only if the "symbol" is not already defined (using the #define directive). The combination of #ifndef and #define directives is commonly used to ensure that the content of a header file is incorporated only once. |

Thus, by using the appropriate combination of header and source files, developers may develop and ship software written in C programming language. In the below description, the software is assumed to be an operating system (such as Solaris Operating System available from Oracle Corporation, the intended assignee of the present invention) that is shipped with the header files in C programming language and source/object files in assembly language.

5. Source Codes of Different Versions of a Software

FIGS. 3 and 4 depict the content of some of the code files respectively in a first/older version (assumed to be 1.0) and a second/newer version (assumed to be 2.0) of a software (operating system) in one embodiment. The code files for the two different versions (1.0 and 2.0) of the software are assumed to be stored in code repository 120. Only a representative number of code files are shown for conciseness. However, in a realistic scenario, a large number of header and source files may be present and stored for each version of the software code, as will be apparent to one skilled in the relevant arts. Each of the Figures is described in detail below.

Referring to FIG. 3, files 300 represent a sample set of header and source files in the older version of the operating system. The header files 310 "a.h", 320 "b.h", 330 "c.h", and 340 "d.h" and source file 350 "main.c" are shown stored in the directory named "os1.0". The content (instructions) of each of the header files 310, 320, 330 and 340 and source file 350 are also shown in FIG. 3. It may be observed that the header files contain data definitions such as lock and va_list (using the keywords "struct", "union", "typedef") and also function declarations such as "int remove (cont char* _filename);" (having the format "return_type function_name (parameters);").

It may be further observed that file 310 "a.h" contains incorporate (#include) statements for incorporating the content of file 320 "b.h", file 330 "c.h" and file 340 "d.h". However, the incorporate statements for files "c.h" and "d.h" are shown as part of an "#if #else" directive with the condition "_WORDSIZE=64" to indicate that the file "c.h" is to be incorporated only if the condition is true and the file "d.h" is to be incorporated only if the condition is false. The incorporate statement for "b.h" is not shown in an "#if #else" directive indicating that the file "b.h" is to be always incorporated as part of file 310 "a.h".

For illustration, only one level of incorporation is shown as being present in the code files. However in alternative embodiments, multiple levels of incorporation may be present in the code files (for example, the incorporated files such as "b.h" may contain incorporate statements, incorporating other files, which in turn may also contain incorporate statements), and the features of the present invention may be implemented in such embodiments as well, as will be apparent to one skilled in the relevant arts by reading the disclosure herein.

It should be noted that the source file 350 "main.c" represents the main code file that is executed first during the execution of the software. In the example embodiment, the main code file 350 is merely used to initialize the construction of the listing by incorporating the main header file 310 "a.h" (as may be observed in the instructions forming file 350). Such a dummy main code file may be required as the source files are shipped in assembly language.

Referring to FIG. 4, files 400 represent a sample set of header and source files in the newer version of the operating system. The header files 410 "a.h", 420 "b.h", 430 "c.h", and 440 "d.h" and source file 450 "main.c" are shown stored in the directory named "os2.0". The content (instructions) of each of the header files 410, 420, 430 and 440 and source file 450 are also shown in FIG. 4. It may be observed that the header file 410 "a.h" unconditionally incorporates header file 420 "b.h" and conditionally incorporates (based on the same condition "_WORDSIZE=64") the contents of the header files 430 "c.h" and 440 "d.h". Source file 450 "main.c" represents a dummy main code file similar to source file 350. It may be further observed that the contents of header files "a.h" and "d.h" are different between the older and newer versions.

Thus, the code files (source code) of different versions of an operating system are maintained in code repository 120. Developers may develop user applications (also assumed to be written in C programming language) that are designed to operate with (be executed by) the operating system. Each user application may be designed to use some of the data definitions specified in the header files and/or invoke some of the functions implemented in the source files (and whose declarations are specified in the header files).

A developer of a user application designed to operate with the older version (1.0) of the operating system may wish to migrate the user application to the newer version (2.0) of the operating system. Such migration typically entails changing the user application to be operative with the newer version if the data definitions/functions used by the user application have been changed in the newer version of the operating system. The developer may accordingly wish to identify the differences between the source codes (in particular, the header files) of the different versions of the software (operating system).

The developer may accordingly send a request containing the identifiers (for example, os1.0 and os2.0) of the source codes to be compared to server system 150. The processing of the request by server system 150, with respect to the code portions shown in FIGS. 3 and 4, is described below with examples.

6. Constructing Listings for the Source Codes

In response to the request containing the identifiers, server system 150 retrieves the code files of FIGS. 3 and 4 and constructs corresponding listings of instructions by replacing each occurrence of an incorporate statement (#include directive) with the instructions stored in the corresponding incorporated file (such as "b.h", "c.h" and "d.h"). Replacing implies that the incorporate statement is removed from (not present in) the constructed listing of instructions. However, in alternative embodiments, the instructions from the incorporated file may be included in the listing without removing/replacing the incorporate statement.

Server system 150 may similarly process conditional incorporate statements (where different files are incorporated based on a condition) occurring in the source codes. According to an aspect of the present invention, server system 150 replaces each occurrence of a conditional incorporate statement with the instructions in all the different incorporated files that are specified as part of the statement (either in the true or false branch of the condition).

It should be noted that the inclusion of the instructions from all the different incorporated files facilitates server system 150 to later compare the listings without evaluating the conditions (to determine whether the condition is true or false). Such a feature may be desirable when the result (true or false) of the condition in the conditional incorporate statement is not capable of being determined during the constructing of the listing. For example, due to the non-availability of the values of variables specified in the condition, it may not be possible to evaluate any comparisons specified in the condition.

FIGS. 5A and 5B depict the respective listing of instructions constructed (by server system 150) for a first/older version (1.0) and a second/newer version (2.0) of a software (operating system) in one embodiment. In particular, FIG. 5A depicts the listing constructed for the code files shown in FIG. 3 (version 1.0 of the operating system), while FIG. 5B depicts the listing constructed for the code files shown in FIG. 4 (version 2.0 of the operating system).

Referring back to FIG. 3, server system 150 first identifies that file 310 "a.h" is the file included in the main file and accordingly processes the incorporate statements (#include directive) present in file 310. Server system 150 accordingly replaces the incorporate statements with the corresponding instructions from files 320 "b.h", 330 "c.h" and 340 "d.h". It may be observed that the instructions of both the files 330 and 340 are included in the listing, even though they are specified in different (true and false) branches of the conditional incorporate statement. Code portions 510, 520, 530 and 540 depict instructions from the original file "a.h" 310 that have been retained in the listing. Thus, the listing in FIG. 5A represents the listing of the instructions in version 1.0 of the operating system.

Similarly, server system 150 also constructs the listing of the source code for version 2.0 of the operating system by replacing the incorporate statements with the corresponding instructions from files 420 "b.h", 430 "c.h" and 440 "d.h", as shown in FIG. 5B. Code portions 550, 560, 570 and 580 depict instructions from the original file "a.h" 410 that have been retained in the listing. It may be observed that the listing of FIG. 5B includes the instructions from both files 430 and 440, the different branches of the corresponding conditional incorporate statement. It may be further observed that the listings of FIGS. 5A and 5B do not contain any incorporate statements.

It may be appreciated that in higher level programming languages (such as C), code files are often used to enforce modular programming (whereby similar functionalities are implemented together in a single code file), while a main code file invokes the functionalities after incorporating the corresponding code files. Accordingly, constructing a listing based on incorporate statements may cause all the instructions in the source code to be included in the listing. The listings of FIGS. 5A and 5B may accordingly represent all the instructions in the source codes of the different versions respectively.

Thus, server system 150 constructs the listings for the source codes of different versions (1.0 and 2.0) of a software (operating system). Server system 150 then determines and compares the functional constructs in the two listings of the source codes as described below with examples.

7. Determining and Comparing Functional Constructs

In one embodiment, server system 150 determines only the data types (defined using the C keyword "typedef"), the structures/unions (defined using the C keywords "struct" and "union") and the function declarations (having the format "return_type function_name (parameters);") as the functional constructs of interest in the header files of the operating system/software. The determined functional constructs are maintained in the form of a node, to facilitate later comparison with corresponding constructs determined for the other listing.

In the case of conditional incorporate statements ("#if #else" directives), the functional constructs determined in the instructions in each (true or false) branch of each condition are maintained as corresponding child nodes of a previous node (containing the functional constructs determined from the previous instructions). Thus, the functional constructs for a listing may be maintained as a hierarchy of nodes (containing a root node having no parent and leaf nodes having no child nodes), with each path from the root node to a leaf node representing a possible execution flow for the instructions in the listing. Other definitions/directives in the listings of the source codes are ignored by server system 150 in the embodiment described below.

FIGS. 6A and 6B depict the respective hierarchy of nodes/functions constructs determined for the listing of instructions for a first/older version (1.0) and a second/newer version (2.0) of a software (operating system) in one embodiment. In particular, FIG. 6A depicts hierarchy 600 determined for the listing shown in FIG. 5A (version 1.0 of the operating system), while FIG. 6B depicts hierarchy 650 determined for the listing shown in FIG. 5B (version 2.0 of the operating system).

Referring to FIG. 6A, each of nodes 610, 620, 625, 630 and 640 represents the functional constructs determined in corresponding code portions (set of instructions) of the listing shown in FIG. 5A. Each node is shown as a box having three sections, the top section indicating the data types, the middle section indicating the structures/unions and the bottom portion indicating the function declarations determined in the corresponding code portion. Thus, node 610 corresponding to code portion 510 indicates that there are no data types, structures/unions or function declarations in code portion 510.

As noted above, in response to the conditional incorporate statement "#if" in code portion 510, the functional constructs determined in code portions 330 and 340 of FIG. 5A are added as child nodes 620 and 625 to the previous node 610. The specific conditions "_WORDSIZE==64" and "!(_WORDSIZE==64)" ("!" being the NOT operator in C language) on which the nodes are branching is also maintained as part of the hierarchy.

In general, for a conditional construct statement having a condition and multiple code portions (such as "#if #else" directive), the functional constructs determined in the code portion incorporated (between the #if and #else keywords) when the condition is true are stored in a first node associated with the condition, while the constructs determined in the code portion incorporated (between the #else and #endif keywords) when the condition is false are stored in a second node associated with a negation of the condition. It should be noted that the conditions stored in each hierarchy are merely used for identifying the corresponding nodes in the two hierarchies to be compared, and are not evaluated during the comparison.

Node 620 indicates that code portion 330 contains a data type "lock", has a union named "lock" containing two fields _size (of data type int) and _align (of data type int), and also has a function declaration "int lock_init(lock *_lock, int _ pshared)". Similarly, node 625 indicates the functional constructs determined in code portion 340. It may be observed that there are no functional constructs in data portions 520 and 530 and accordingly there are no nodes added corresponding to these portions. Node 630 indicates the functional constructs determined in code portion 320 of FIG. 5B (the content of file 320 "b.h"), while node 640 indicates the functional constructs determined in code portion 540 (containing some of the instructions from incorporating file 310 "a.h").

It may be further observed that hierarchy 600 has two paths from the root node to a leaf node (that is, 610-620-630-640 and 610-625-630-640) representing the possible two execution flows for the instructions in the listing. In general, the number of possible execution flows is determined by the number of conditional incorporate statements present in a source code. In a worst case scenario when there are "m" conditional incorporate statements in the same incorporating file, the hierarchy contains $2^m$ (where ^ is the exponentiation/power operator) possible execution flows.

Thus, server system 150 builds hierarchy 600 corresponding to the functional constructs determined in the listing of FIG. 5A. Similarly, server system 150 also builds hierarchy 650 of FIG. 6B corresponding to the functional constructs determined in the listing of FIG. 5B. In particular, the nodes of 660, 670, 675, 680 and 690 respectively specify the functional constructs determined in code portions 550, 430, 440, 420 and 580. There are no nodes added for code portions 560 and 570 as there are no functional constructs of interest present in those code portions.

After building both the hierarchies for both the listings, server system 150 compares the nodes of hierarchies 600 and 650 to determine the differences between the listings/source codes. In particular, server system 150 compares and identifies the differences between the data types, structures/unions and function declarations stored in each of the nodes in hierarchy 600 with the constructs stored in the corresponding nodes in hierarchy 650.

The specific nodes to be compared may be determined based on the stored conditions and the level in the hierarchy. For example, nodes 610, 630 and 640 in hierarchy 600 are compared to nodes 660, 680 and 690 in hierarchy 650, since the respective nodes are in the same level (1, 3 and 4, when counting the levels from the root). However, node 620 is compared to node 670 since both the nodes branch from the parent node based on a condition "_WORDSIZE==64" being true (though both the nodes are on the same level 2 in the hierarchy), while node 625 is compared to node 675 since the two nodes branch based on the same condition being false. Thus, server system 150 compares the nodes 610, 620, 625, 630 and 640 in hierarchy 600 to the respective node 660, 670, 675, 680 and 690 in hierarchy 650.

In general, two nodes (e.g. 625 and 675) are considered to be equal or same only if the following comparison tests are true:

(a) the number of data types specified in (the top section of) the two nodes are the same;
(b) the number of structures/unions specified in (the middle section of) the two nodes are the same;
(c) the number of function declarations specified in (the bottom section of) the two nodes are the same;
(d) for every data type specified in one of the nodes (e.g. 625), there is corresponding definition in the other node (e.g. 675);
(e) for every structure/union specified in one of the nodes, there is a corresponding structure/union defined in the other node; and
(f) for every function declaration specified in one of the nodes, there is a corresponding functional declaration in the other node and the number as well as the type of arguments/parameters in the two functional declaration also matches.

Two hierarchies (such as 600 and 650) are considered equal/same only if they have the same shape (the number of levels, nodes, conditions, etc.) and each node in the hierarchy are determined to be equal/same according to the comparison tests noted above. With respect to the nodes shown in hierarchy 600 and 650, server system 150 may identify that the nodes 625 and 675 are not equal (since they differ in at least one structure and function declaration), and also that nodes 640 and 690 are not equal (since they differ in the data type).

It may be appreciated that for illustration, only one conditional incorporate statement is shown as being present in the code files of FIGS. 3/4 and accordingly in the listings of FIGS. 5A/5B and in the hierarchies of FIGS. 6A/6B. However, in alternative embodiments, the code files may contain multiple incorporate statements as noted above, with the hierarchy then containing a corresponding number of branching child nodes. The features of the present invention can be applied to such scenarios as well, as will be apparent to one skilled in the relevant arts by reading the disclosure herein.

Thus, server system 150 determines and compares the functional constructs in the two listings of the source codes to identify the differences in the source codes of different versions (1.0 and 2.0) of a software (operating system). Server system 150 may then present (for example, display on a display unit) the identified differences between the different source codes.

In the embodiment noted above, server system 150 sends the determined differences as a response to the request received from the developer. The response may be sent in the form of web pages to the requesting developer system (such as 160A-160X), where the web pages are then displayed (on a display unit) using a browser application executing in the requesting developer system. The manner in which the differences in the source codes of different versions of a software may be presented is described below with examples.

8. Presenting the Differences

Figure 7:
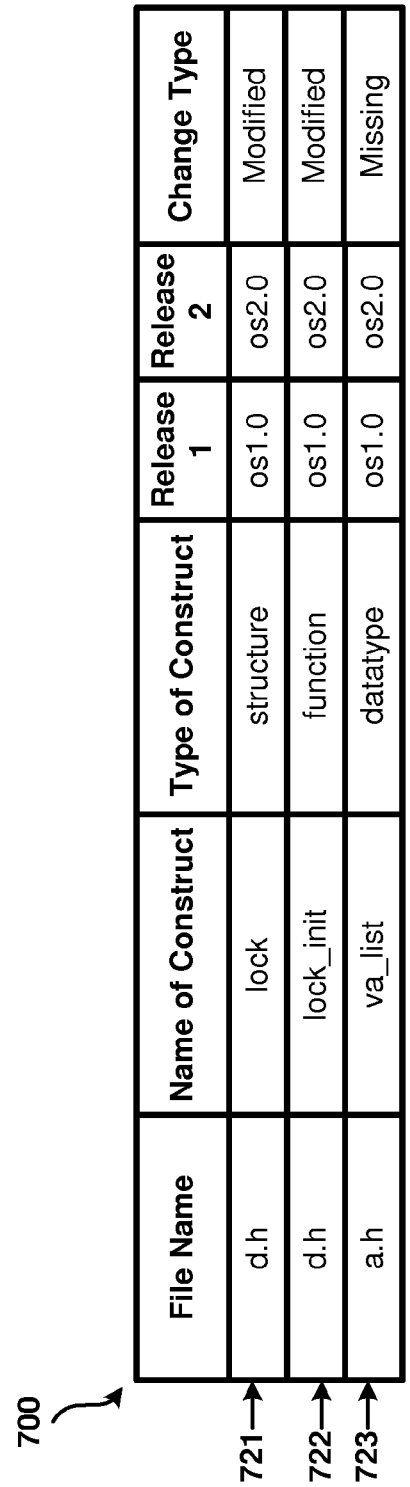
FIG. 7 depicts a sample display for presenting the differences identified between the source codes of different versions of a software in one embodiment.

FIG. 7 depicts a sample display for presenting the differences identified between the source codes of different versions (1.0 and 2.0) of a software (operating system) in one embodiment. The display may be generated by server system 150 and sent as part of a web page to requesting developer system (one of 160A-160X), after identification of the differences in the source codes based on comparing the hierarchies (600 and 650) of FIGS. 6A and 6B.

Thus, table 700 indicates the name of the files (column "File Name") in which each of the differences is present, the name and type of the construct (columns "Name of Construct" and "Type of Construct"), the releases/versions of the software compared (columns "Release 1" and "Release 2") and the type of change/difference (column "Change Type").

Rows 721 and 722 indicates that the structure named "lock" and the function named "lock_init" are modified (value in "Change Type" column) between the versions "os1.0" and "os2.0", while row 723 indicates that the data type named "va_list" is missing between the versions "os1.0" and "os2.0". It may be appreciated that rows 721 and 722 may be generated in response to the differences identified between nodes 625 and 675, while row 723 may be generated in response to the difference identified between nodes 640 and 690.

Thus, a developer wishing to migrate a user application from the older version (1.0) of the operating system to the newer version (2.0) is enabled to view/identify the specific data definitions/functions that have changed between the versions. The developer may accordingly modify the user application to use the changed data definitions/functions in the newer version and thereby make the user application capable of operating with the newer version of the operating system.

It should be noted that the techniques of the present invention may be implemented in other scenarios such as for comparison of different softwares (e.g. two different Unix-Like operating systems) as well, as will be apparent to one skilled in the relevant arts by reading the disclosure herein. Such an implementation may simplify the migration of users applications from one operating system to another "similar" operating system.

Furthermore, it may be appreciated that the techniques of the invention described above can be used to identify the difference between two source codes, even when the incorporate statements are re-ordered (that is, instructions are included in a order different from that shown in FIGS. 3 and 4). Also, each of the incorporated and incorporating code files is retrieved/loaded into memory only once during the constructing of the listing of instructions. Such a one-time loading may be desirable when the number of code files in a source code is very large (in the order of thousands).

It should be further appreciated that the features described above can be implemented in various embodiments as a desired combination of one or more of hardware, executable modules, and firmware. The description is continued with respect to an embodiment in which various features are operative when the executable modules described above are executed.

9. Digital Processing System

Figure 8:
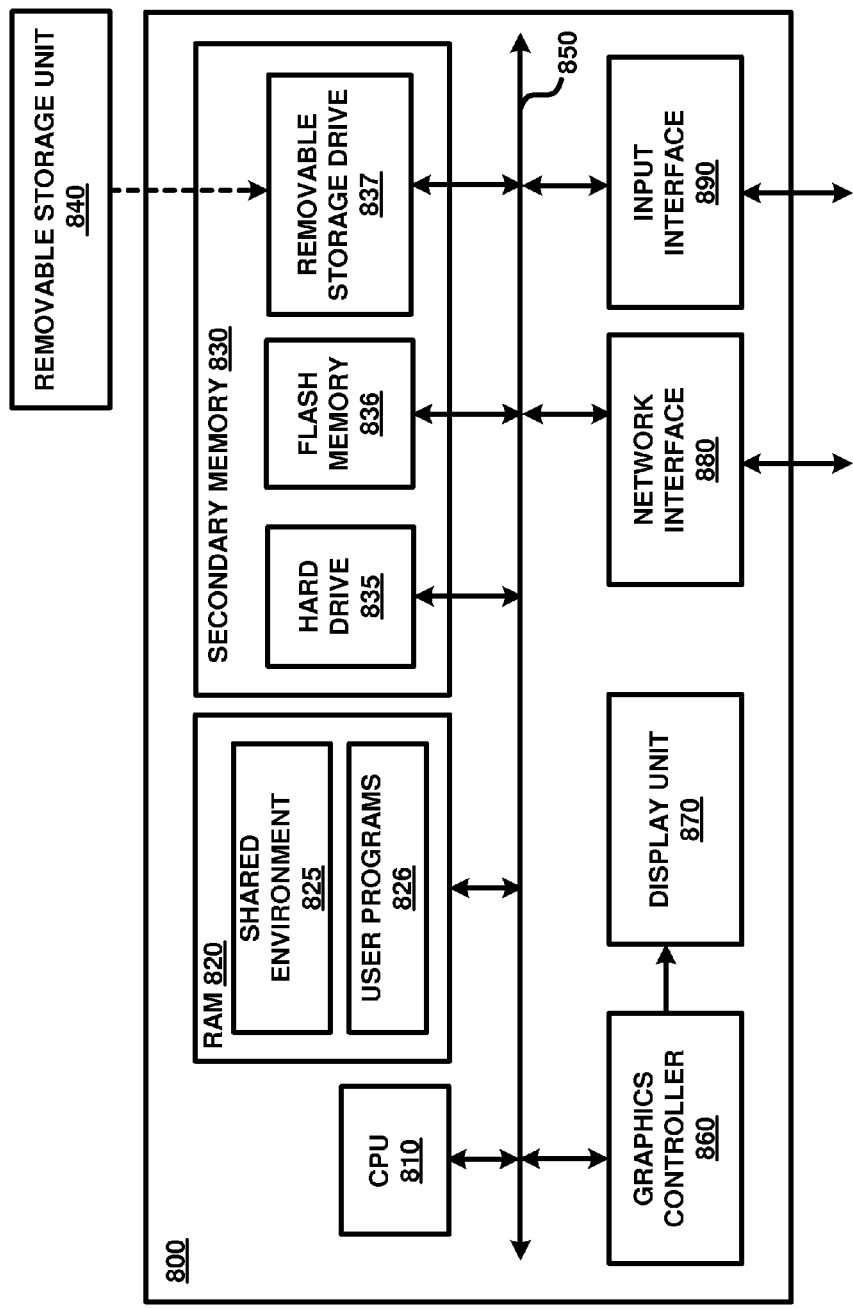
FIG. 8 is a block diagram illustrating the details of a digital processing system in which several aspects of the present invention are operative by execution of appropriate executable modules in one embodiment.

FIG. 8 is a block diagram illustrating the details of digital processing system 800 in which several aspects of the present invention are operative by execution of appropriate executable modules in one embodiment. Digital processing system 800 may correspond to server system 150.

Digital processing system 800 may contain one or more processors (such as a central processing unit (CPU) 810), random access memory (RAM) 820, secondary memory 830, graphics controller 860, display unit 870, network interface 880, and input/output interface 890. All the components except display unit 870 may communicate with each other over communication path 850, which may contain several buses as is well known in the relevant arts.

CPU 810 may execute instructions stored in RAM 820 to provide several features of the present invention. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or user programs 826. Shared environment 825 contains utilities shared by user programs, and such shared utilities include operating systems, virtual machines, etc., which provide a (common) run-time environment for execution of user programs 826 (such as browsers, email client software).

Graphics controller 860 generates display signals (e.g., in RGB format) to display unit 870 based on data/instructions received from CPU 810. Display unit 870 contains a display screen to display the images defined by the display signals. Input/output interface 890 includes input as well as output devices to enable a user to interact with system 800. Network interface 880 provides the physical, electrical and protocol implementations that enable system 800 to communicate with other systems of FIG. 1 using protocols such as TCP/IP.

Secondary memory 830 (representing a non-transitory storage/medium) may contain hard drive 835, flash memory 836, and removable storage drive 837. Secondary memory 830 may store data (for example, portions of data shown in FIGS. 3, 4, 5A, 5B, 6A and 6B) and software instructions (for example, for performing the steps of FIG. 2), which enable digital processing system 800 to provide several features in accordance with the present invention, as described above.

Some or all of the data and instructions may be provided on removable storage unit 840, and the data and instructions may be read and provided by removable storage drive 837 to CPU 810. Floppy drive, magnetic tape drive, CD-ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer readable storage medium having stored therein computer software and/or data. However, the computer (or machine, in general) readable storage medium can be in other forms (e.g., non-removable, random access, etc.).

In this document, the term "computer program product" is used to generally refer to secondary memory 830. These computer program products are means for providing software to digital processing system 800. CPU 810 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of identifying differences between source codes when each source code is organized using incorporated files, said method comprising:

receiving identifiers of a first source code and a second source code, said first source code being organized as a first plurality of code files and said second source code being organized as a second plurality of code files, wherein said first source code contains a first conditional incorporate statement having a first condition, said first conditional incorporate statement indicating that a first code file of said first plurality of code files is to be incorporated when said first condition is true and a second code file of said first plurality of code files is to be incorporated when said first condition is false, wherein said second source code contains a second conditional incorporate statement also having said first condition, said second conditional incorporate statement indicating that a third code file of said second plurality of code files is to be incorporated when said first condition is true and a fourth code file of said second plurality of code files is to be incorporated when said first condition is false;

constructing a first listing of instructions for said first source code and a second listing of instructions for said second source code, wherein said constructing said first listing comprises including, for each incorporate statement in said first plurality of code files, the instructions stored in a corresponding one of said first plurality of code files as specified by the corresponding incorporate statement, wherein said constructing, in response to said first conditional incorporate statement, includes the instructions stored in both of said first code file and said second code file respectively as a first code portion and a second code portion in said first listing of instructions without evaluation of said first condition, wherein said constructing said second listing comprises including, for each incorporate statement in said second plurality of code files, the instructions stored in a corresponding one of said second plurality of code files as specified by the corresponding incorporate statement, wherein said constructing, in response to said second conditional incorporate statement, includes the instructions stored in both of said third code file and said fourth code file respectively as a third code portion and a fourth code portion in said second listing of instructions without evaluation of said first condition; and finding the differences between said first source code and said second source code by comparing said first listing of instructions and said second listing of instructions, wherein said comparing compares the instructions in said first code portion with instructions in said third code portion in view of both of said first code portion and said third code portion being present in said first listing and said second listing corresponding to said first condition being true, and compares the instructions in said second code portion with instructions in said fourth code portion in view of both of said second code portion and said fourth code portion being present in said first listing and said second listing corresponding to said first condition being false.

2. The method of claim 1, wherein said first source code is of a first version of a software and said second source code is of a second version of said software.

3. The method of claim 2, wherein said software comprises an operating system, wherein the identified differences are used to determine the modifications necessary for applications to be migrated from said first version of said operating system to said second version of said operating system.

4. The method of claim 2, further comprising retrieving said first plurality of code files and said second plurality of code files from a code repository in response to said receiving of said identifiers, wherein said constructing is performed after said retrieving.

5. The method of claim 4, wherein said first listing comprises all the instructions in said first source code and said second listing comprises all the instructions in said second source code.

6. The method of claim 5, wherein said including comprises replacing each incorporate statement with the instructions stores in the code file specified by the corresponding incorporate statement.

7. The method of claim 1, wherein said finding comprises determining a first set of functional constructs in said first listing and a second set of functional constructs in said second listing, wherein said comparing compares said first set of functional constructs with said second set of functional constructs to determine the differences between said first source code and said second source code.

8. The method of claim 7, further comprising:

building, in response to said determining, a first hierarchy of nodes and a second hierarchy of nodes, wherein each node in said first hierarchy of nodes and said second hierarchy of nodes respectively indicates the functional constructs determined in a corresponding code portion of said first listing and said second listing, wherein said comparing compares the functional constructs in each node of said first hierarchy of nodes with a corresponding node of said second hierarchy of nodes to determine the differences.

9. The method of claim 1, wherein a result of evaluation of said first condition is not capable of being determined during said constructing.

10. A non-transitory machine readable medium storing one or more sequences of instructions for causing a system to identify differences between source codes when each source code is organized using incorporated files, wherein execution of said one or more instructions by one or more processors contained in said system causes said system to perform the actions of:

receiving identifiers of a first source code and a second source code, said first source code being organized as a first plurality of code files and said second source code being organized as a second plurality of code files, wherein said first source code contains a first conditional incorporate statement having a first condition, said first conditional incorporate statement indicating that a first code file of said first plurality of code files is to be incorporated when said first condition is true and a second code file of said first plurality of code files is to be incorporated when said first condition is false, wherein said second source code contains a second conditional incorporate statement also having said first condition, said second conditional incorporate statement indicating that a third code file of said second plurality of code files is to be incorporated when said first condition is true and a fourth code file of said second plurality of code files is to be incorporated when said first condition is false;

constructing a first listing of instructions for said first source code and a second listing of instructions for said second source code, wherein said constructing said first listing comprises including, for each incorporate statement in said first plurality of code files, the instructions stored in a corresponding one of said first plurality of code files as specified by the corresponding incorporate statement, wherein said constructing, in response to said first conditional incorporate statement, includes the instructions stored in both of said first code file and said second code file respectively as a first code portion and a second code portion in said first listing of instructions without evaluation of said first condition, wherein said constructing said second listing comprises including, for each incorporate statement in said second plurality of code files, the instructions stored in a corresponding one of said second plurality of code files as specified by the corresponding incorporate statement, wherein said constructing, in response to said second conditional incorporate statement, includes the instructions stored in both of said third code file and said fourth code file respectively as a third code portion and a fourth code portion in said second listing of instructions without evaluation of said first condition; and finding the differences between said first source code and said second source code by comparing said first listing of instructions and said second listing of instructions, wherein said comparing compares the instructions in said first code portion with instructions in said third code portion in view of both of said first code portion and said third code portion being present in said first listing and said second listing corresponding to said first condition being true, and compares the instructions in said second code portion with instructions in said fourth code portion in view of both of said second code portion and said fourth code portion being present in said first listing and said second listing corresponding to said first condition being false.

11. The machine readable medium of claim 10, further comprising one or more instructions for retrieving said first plurality of code files and said second plurality of code files from a code repository in response to said receiving of said identifiers, wherein said constructing is performed after said retrieving.

12. The machine readable medium of claim 10, wherein said finding comprises one or more instructions for determining a first set of functional constructs in said first listing and a second set of functional constructs in said second listing,
wherein said comparing compares said first set of functional constructs with said second set of functional constructs to determine the differences between said first source code and said second source code.

13. The machine readable medium of claim 12, further comprising one or more instructions for:
building, in response to said determining, a first hierarchy of nodes and a second hierarchy of nodes, wherein each node in said first hierarchy of nodes and said second hierarchy of nodes respectively indicates the functional constructs determined in a corresponding code portion of said first listing and said second listing,
wherein said comparing compares the functional constructs in each node of said first hierarchy of nodes with a corresponding node of said second hierarchy of nodes to determine the differences.

14. The machine readable medium of claim 10, wherein a result of evaluation of said first condition is not capable of being determined during said constructing.

15. A digital processing system comprising:
a processor;
a random access memory (RAM);
a machine readable medium to store one or more instructions, which when retrieved into said RAM and executed by said processor causes said digital processing system to identify differences between source codes when each source code is organized using incorporated files, said digital processing system performing the actions of:
receiving identifiers of a first source code and a second source code, said first source code being organized as a first plurality of code files and said second source code being organized as a second plurality of code files,
wherein said first source code contains a first conditional incorporate statement having a first condition, said first conditional incorporate statement indicating that a first code file of said first plurality of code files is to be incorporated when said first condition is true and a second code file of said first plurality of code files is to be incorporated when said first condition is false,
wherein said second source code contains a second conditional incorporate statement also having said first condition, said second conditional incorporate statement indicating that a third code file of said second plurality of code files is to be incorporated when said first condition is true and a fourth code file of said second plurality of code files is to be incorporated when said first condition is false;
constructing a first listing of instructions for said first source code and a second listing of instructions for said second source code, wherein said constructing said first listing comprises including, for each incorporate statement in said first plurality of code files, the instructions stored in a corresponding one of said first plurality of code files as specified by the corresponding incorporate statement,
wherein said constructing, in response to said first conditional incorporate statement, includes the instructions stored in both of said first code file and said second code file respectively as a first code portion and a second code portion in said first listing of instructions without evaluation of said first condition,
wherein said constructing said second listing comprises including, for each incorporate statement in said second plurality of code files, the instructions stored in a corresponding one of said second plurality of code files as specified by the corresponding incorporate statement,
wherein said constructing, in response to said second conditional incorporate statement, includes the instructions stored in both of said third code file and said fourth code file respectively as a third code portion and a fourth code portion in said second listing of instructions without evaluation of said first condition; and
finding the differences between said first source code and said second source code by comparing said first listing of instructions and said second listing of instructions,
wherein said comparing compares the instructions in said first code portion with instructions in said third code portion in view of both of said first code portion and said third code portion being present in said first listing and said second listing corresponding to said first condition being true, and compares the instructions in said second code portion with instructions in said fourth code portion in view of both of said second code portion and said fourth code portion being present in said first listing and said second listing corresponding to said first condition being false.

16. The digital processing system of claim 15, for said finding, performing the actions of:
determining a first set of functional constructs in said first listing and a second set of functional constructs in said second listing; and
building, in response to said determining, a first hierarchy of nodes and a second hierarchy of nodes, wherein each node in said first hierarchy of nodes and said second hierarchy of nodes respectively indicates the functional constructs determined in a corresponding code portion of said first listing and said second listing,
wherein said comparing compares the functional constructs in each node of said first hierarchy of nodes with a corresponding node of said second hierarchy of nodes to determine the differences between said first source code and said second source code.

* * * * *